United States Patent
Schneider et al.

(10) Patent No.: US 9,528,390 B2
(45) Date of Patent: Dec. 27, 2016

(54) HYDRODYNAMIC SLIDING BEARING, IN PARTICULAR OF A MAGNETIC COUPLING PUMP

(75) Inventors: Günther Schneider, Herne (DE); Michael Westib, Bochum (DE); Dirk Koep, Herten (DE)

(73) Assignee: RUHRPUMPEN GMBH, Witten (DE)

( * ) Notice: Subject to any disclaimer, the term of this patent is extended or adjusted under 35 U.S.C. 154(b) by 622 days.

(21) Appl. No.: 14/004,332

(22) PCT Filed: Mar. 1, 2012

(86) PCT No.: PCT/DE2012/000207
§ 371 (c)(1),
(2), (4) Date: Sep. 10, 2013

(87) PCT Pub. No.: WO2012/122964
PCT Pub. Date: Sep. 20, 2012

(65) Prior Publication Data
US 2014/0003917 A1     Jan. 2, 2014

(30) Foreign Application Priority Data

Mar. 11, 2011   (DE) .................. 10 2011 013 830

(51) Int. Cl.
*F01D 25/16*    (2006.01)
*F04D 13/02*    (2006.01)
(Continued)

(52) U.S. Cl.
CPC .............. *F01D 25/16* (2013.01); *F01D 25/166* (2013.01); *F04D 13/026* (2013.01);
(Continued)

(58) Field of Classification Search
CPC ...... F01D 25/16; F01D 25/162; F01D 25/164; F01D 25/166; F04D 29/046; F04D 29/0465; F04D 29/047; F04D 29/0473; F04D 29/0476; F04D 29/056; F04D 29/057; F04D 29/058; F16C 17/22; F16C 17/26; F16C 32/0681; F16C 35/02; F16C 2360/42
(Continued)

(56) References Cited

U.S. PATENT DOCUMENTS

| 5,056,939 | A | * | 10/1991 | Buse | ............... F16C 33/08 384/295 |
| 5,094,550 | A | | 3/1992 | Momose et al. | |

(Continued)

FOREIGN PATENT DOCUMENTS

| CH | EP 0345214 A1 * | 12/1989 | ......... F04D 29/0465 |
| DE | 29500108 U1 * | 2/1995 | ........... F04D 29/026 |

(Continued)

OTHER PUBLICATIONS

International Search Report issued by the European Patent Office in International Application PCT/DE2012/000207 on Jul. 6, 2012.

*Primary Examiner* — Richard Edgar
*Assistant Examiner* — Christopher R Legendre
(74) *Attorney, Agent, or Firm* — Henry M. Feiereisen LLC (57) ABSTRACT

The invention relates to a hydrodynamic sliding bearing of a shaft (2), in particular of a magnetic coupling pump (1), wherein the hydrodynamic sliding bearing (4) comprises a clamping sleeve (7) disposed between bearing sleeves (6), wherein the bearing sleeves (6) are each mounted with their bearing front side (8) on an axial bearing element (9). The hydrodynamic sliding bearing (4) is characterized in that the bearing sleeve (6) and the clamping sleeve (7) have on their respective front sides (11, 12) a respectively correspondingly designed spherical region (18, 19) which intermesh, wherein the clamping sleeve (7) has at least one concentric groove (28, 29, 31) and wherein the axial bearing element (9) has a recess (42) adapted to the bearing front side (8) of the bearing sleeve (6).

14 Claims, 6 Drawing Sheets

(51) Int. Cl.
- *F04D 29/047* (2006.01)
- *F16C 17/22* (2006.01)
- *F16C 17/24* (2006.01)
- *F16C 17/26* (2006.01)
- *F04D 29/057* (2006.01)

(52) U.S. Cl.
CPC .......... *F04D 29/047* (2013.01); *F04D 29/057* (2013.01); *F16C 17/22* (2013.01); *F16C 17/243* (2013.01); *F16C 17/26* (2013.01); *F16C 2360/42* (2013.01)

(58) Field of Classification Search
USPC ..... 384/100, 276, 278, 295, 297, 905, 907.1
See application file for complete search history.

(56) References Cited

U.S. PATENT DOCUMENTS

| | | | | |
|---|---|---|---|---|
| 5,380,112 A | * | 1/1995 | Schicktanz | F04D 29/0465 384/278 |
| 5,683,185 A | * | 11/1997 | Buse | F16C 33/08 384/255 |
| 6,702,468 B2 | * | 3/2004 | Rennett | F04D 29/0465 384/296 |
| 7,056,027 B2 | * | 6/2006 | Puckett | F16C 17/22 384/215 |
| 8,956,067 B2 | * | 2/2015 | Schneider | F04D 29/628 403/28 |
| 9,057,403 B2 | * | 6/2015 | Schneider | F04D 29/047 |
| 2006/0204156 A1 | * | 9/2006 | Takehara | B60B 27/00 384/544 |
| 2011/0234035 A1 | | 9/2011 | Wittschier | |
| 2012/0068565 A1 | * | 3/2012 | Pfeil | F16C 17/10 310/103 |
| 2014/0003917 A1 | * | 1/2014 | Schneider | F04D 29/047 415/171.1 |

FOREIGN PATENT DOCUMENTS

| | | | | |
|---|---|---|---|---|
| DE | 295 00 108 U1 | | 4/1995 | |
| DE | 10 2009 022 916 A1 | | 12/2010 | |
| EP | 0 771 956 A1 | | 5/1997 | |
| EP | 0 814 275 A2 | | 12/1997 | |
| EP | 0 814 275 B1 | | 6/2003 | |
| FR | 923196 A | * | 6/1947 | .............. F16L 23/24 |

* cited by examiner

HYDRODYNAMIC SLIDING BEARING, IN PARTICULAR OF A MAGNETIC COUPLING PUMP

CROSS-REFERENCES TO RELATED APPLICATIONS

This application is the U.S. National Stage of International Application No. PCT/DE2012/000207, filed Mar. 1, 2012, which designated the United States and has been published as International Publication No. WO 2012/122964 and which claims the priority of German Patent Application, Serial No. 10 2011 013 830.7, filed Mar. 11, 2011, pursuant to 35 U.S.C. 119(a)-(d).

BACKGROUND OF THE INVENTION

The invention relates to a hydrodynamic sliding bearing of a shaft, in particular a magnetic coupling pump, wherein the sliding bearing comprises a clamping sleeve disposed between bearing sleeves, wherein the bearing sleeves are each mounted with their bearing front side on an axial bearing.

Magnetic coupling pumps are generally known and described, for example, in DE 10 2009 022 916 A1. In this case, the pump power is transmitted from a drive shaft via a magnet-carrying rotor (outer rotor) in a contact-free manner and substantially free from slippage onto the pump-side magnet carrier (inner rotor). The inner rotor drives the pump shaft which is mounted in a sliding bearing lubricated by the conveying medium, i.e. in a hydrodynamic sliding bearing. Located between the outer rotor and the inner rotor, i.e. between the outer and the inner magnets is the split case with its cylindrical wall. The split case is connected with its flange to a pump component, for example, a casing cover and has a closed base opposite thereto. The split case, i.e. the magnetic coupling pump reliably separates the product case from the environment so that the risk of an escape of product with all the associated negative consequences can be eliminated. A magnetic coupling pump is accordingly the combination of a conventional pump hydraulics with a magnetic drive system. This system uses the attraction and repulsion forces between magnets in both coupling halves for the contact-free and slippage-free transmission of torque. The magnetic coupling pump accordingly has major advantages particularly when handling very valuable or very hazardous substances.

EP 0 814 275 B1 is concerned with a hydrodynamic sliding bearing of a magnetic coupling pump which is configured as a combined axial and radial bearing. The sliding bearing of EP 0 814 275 B1 has two bearing sleeves, two bearing bushings which are slidable on the bearing sleeves, a spacer sleeve disposed between the bearing sleeves and a spacer bushing disposed between the bearing bushings. The bearing sleeves and bushings are made of a ceramic material, where the spacer sleeve or bushing is formed from a metal. In order to create a hydrodynamic sliding bearing which should be inexpensive to manufacture and designed so that at all times sufficient lubrication by the medium to be conveyed enters into the sliding bearing, EP 0 814 275 B1 proposes that the inside diameter of the bearing sleeves is greater than the inside diameter of the spacer sleeve. EP 0 814 275 B1 discloses that the bearing sleeve is radially centred in the cold state above the L ring of the spacer sleeve. In the warm state the centring over the extension of the shaft is taken over by the bearing sleeves. It is to be seen as a disadvantage here that particles, e.g. dirt particles can collect between the shaft and the ceramic bearing sleeve so that there is a risk that the bearing sleeves could be destroyed or could disintegrate during a thermal expansion.

Accordingly hydrodynamic sliding bearings are known the components whereof are formed from different types of materials, where for example, the bearing sleeves consist of a ceramic, e.g. of a sintered silicon carbide and the clamping sleeve or the spacer sleeve consists of a metal, e.g. a stainless steel. However, the materials exhibit different properties which should be taken into account, where for example, different (thermal) coefficients of expansion should be mentioned. In this respect during thermal stressing of the metal-ceramic connection, stresses can occur where the metallic connection partners expand more than the ceramic connection partner. The thermally induced different axial expansion can be compensated by, for example, using flexible elements such as for example flat seals as thermal compensating elements. A radial centring can be accomplished, for example, by means of tolerance rings. A disadvantage with this connection however is the inadequate compressibility and permanent elasticity of the flexible materials (axial) and the tolerance rings (radial) which over time, i.e. operating time, lead to fatigue of the material. The sliding bearing is pre-stressed during mounting. As a result of the thermal expansion, there is a risk of a release of the axial tension, in particular between the impeller and the inner magnetic rotor. Even with low axial loading behind the impeller, this results in axial enlargement of the gap in the force fit between the impeller and the ceramic bearing disks. Consequently, the impeller lurches. This leads to vibrations and exceptional loads which can lead to damage of the impeller/shaft connection (e.g. vibration failure). However there is also a risk of destruction of the ceramic component if harmful stress transitions and/or stress peaks occur which, for example, is possible if the abutting front sides are canted.

SUMMARY OF THE INVENTION

It is the object of the invention to improve or provide a hydrodynamic sliding bearing of the type mentioned initially with simple means in which at least the aforesaid disadvantages are avoided, where a thermal compensation for expansion with simultaneous centring, i.e. a constant true running is to be ensured despite different materials.

According to the invention, the object is solved by a hydrodynamic sliding bearing having a clamping sleeve disposed between bearing sleeves, wherein the bearing sleeves are each mounted with their bearing front side on an axial bearing element, wherein the bearing sleeve and the clamping sleeve have on their respective front sides a respectively correspondingly designed spherical region which intermesh.

It should be pointed out that the features listed individually in the claims can be combined with one another in any technically meaningful manner and show further embodiments of the invention. The description additionally characterizes and specifies the invention in particular in connection with the figures.

According to the invention, a hydrodynamic sliding bearing of a shaft, in particular of a magnetic coupling pump is provided, which comprises a clamping sleeve disposed between bearing sleeves, wherein the bearing sleeves are each mounted with their bearing front side on an axial bearing element. It is expediently provided that the bearing sleeve and the clamping sleeve have on their respective abutting front sides a respectively correspondingly designed spherical region, which spherical regions intermesh.

In a preferred embodiment it is provided that the respective bearing sleeve has a spherical, i.e. designed in a ball shape, surface on the relevant front side, wherein the clamping sleeve then has a correspondingly designed indentation. Naturally it can also be provided to dispose the spherical, i.e. globe-like surface in each case on the front sides of the respective clamping sleeve, where the corresponding indentation would then naturally be disposed on the relevant front side of the bearing sleeve.

In a further preferred embodiment the bearing sleeve has on its relevant front side the spherically designed region on which transition regions, i.e. an inner transition region and an outer transition region are disposed in the direction of the inner or outer circumference of the bearing sleeve. The inner circumference of the bearing sleeve is oriented in the direction of the shaft, where the outer circumference is disposed opposite thereto, preferably is oriented in the direction of a bearing bushing. The inner transition region is designed to run at a slight inclination oriented away from the inner circumferential surface and adjoins the spherical region. The outer transition region is designed to run in the opposite direction thereto from the spherical region opening onto the outer circumferential surface. The globe-like surface, i.e. the spherical surface is preferably disposed off-centre or offset outwards with its zenith relative to a central axis of the bearing sleeve. It is further preferred if the inner transition region has a greater amount of extension than the outer transition region. The relevant front side of the bearing sleeve thus has the spherical region which is thus designed as a globe-like section, as it were, where the relevant front side still has the quasi-conically running transition regions. Naturally, the zenith can also be arranged centrally, i.e. congruently to the central axis, which naturally means a suitably adapted configuration of the transition regions.

Advantageously as a result of the spherical configuration or as a result of the quasi spherical-section-like configuration of the surface oriented towards the indentation it is achieved that under mechanical pre-stressing of the ceramic-metal connection and/or under thermal expansion of the metal component, for example, an edge loading is avoided. Instead harmful stress transitions and/or stress peaks are avoided. In addition, under thermal stressing or under compressive stressing it is advantageously achieved that a quasi-centred mounting position is always ensured by the spherical-section-like contact in the corresponding indentation. In particular, the different-type connection of the metal and ceramic connecting partners can be made more simply since the spherical configuration enables uniform stress transitions where a spot-like or linear loading is avoided, where instead a uniform surface loading produced over the spherical surface is achieved.

It is also advantageous that the clamping sleeve having the expedient spherical configuration on its front sides in the operating state rolls on the corresponding spherical configuration of the respective front side of the bearing sleeve without loading this radially or axially.

It is also possible that the bearing sleeve is formed from a sintered ceramic (e.g. sintered silicon carbide; SSiC). The relevant front side with its expedient configuration can be sintered simultaneously during manufacture of the bearing sleeve or can be produced subsequently or moulded on. The clamping sleeve can be formed from a metallic or non-metallic material.

The solution of the object is also achieved however with a hydrodynamic sliding bearing of a shaft, in particular of a magnetic coupling pump which comprises a clamping sleeve disposed between bearing sleeves, wherein the bearing sleeves are each mounted with their bearing front side on an axial bearing element where the clamping sleeve has at least one concentric groove on at least one of its longitudinal sides, preferably an equatorial concentric groove.

Concentric grooves in the sense of the invention are material recesses which are guided from an outer circumference in the direction of an inner circumference or from an inner circumference in the direction of an outer circumference without being continuous. Through the concentric groove the clamping sleeve acquires a certain adaptability or flexibility, where the clamping sleeve is tensioned during assembly under pre-stressing whereby expansion of the clamping sleeve caused under thermal action are compensated. If the concentric grooves are disposed with their central axis perpendicular to a flat surface, this is an equatorial concentric groove in the sense of the invention. Naturally the concentric grooves can also be provided with their central axis at an angle to the flat surface.

The clamping sleeve therefore has an inner circumference and an outer circumference opposite thereto. With the inner circumference the clamping sleeve is oriented in the direction of the shaft or in the direction of the magnetic coupling pump shaft. It is expediently provided that the clamping sleeve has a plurality of concentric grooves. In a preferred embodiment, it can be provided to introduce respectively one concentric groove in a front side region of the clamping sleeve which can be designed in a slot-like manner. The exemplary slot-like concentric grooves can be introduced into the clamping sleeve from the inner circumference in the direction of the outer circumference.

In a further preferred embodiment it can be provided that the clamping sleeve has a concentric groove which is introduced centrally into the clamping sleeve. It is favourable if this central concentric groove is introduced into the clamping sleeve from the inner circumference in the direction of the outer circumference, that is preferably having the same orientation as the front-side concentric grooves in the clamping sleeve. For example, the front-side concentric grooves can be narrower than the centrally disposed concentric groove.

In a further favourable embodiment it can be provided to provide intermediate concentric grooves between the respective front-side concentric grooves and the central concentric groove, which intermediate concentric grooves are introduced into the clamping sleeve from the outer circumference in the direction of the inner circumference, i.e. oppositely oriented to the front-side and the central concentric groove in the clamping sleeve.

It is expedient if the front-side concentric grooves disposed in the front-side region are for example, slot-like having a preferably rounded slot base. The central concentric groove can be U-shaped when viewed in cross-section having a base web and two U legs, where the U legs can be disposed perpendicular to the base. It can preferably be provided to design the intermediate concentric grooves as quasi-U-shaped, where the U legs are disposed oriented away from one another at an obtuse angle to the base, so that a material recess expanding conically from the base web in the direction of the outer circumference is formed. Naturally the geometrical configuration of the concentric grooves and material recesses mentioned as an example should not be restrictive. In particular, the sequence and number of the concentric grooves is merely an example.

The clamping sleeve described as an example can advantageously compensate for thermal expansions. It is particularly expedient if the clamping sleeve still has the previously described spherical configuration on its front sides. In a particularly preferred embodiment the clamping sleeve has on its front side the spherical indentation designed to correspond to the spherical surface of the associated front side of the bearing sleeve.

In a particularly preferred embodiment, the clamping sleeve consists of a metallic or non-metallic material, in particular of a high-temperature-resistant stainless steel or one having similar physical material properties. Duplex steels or spring steels are also feasible.

The solution of the object is also achieved however with a hydrodynamic sliding bearing of a shaft, in particular of a magnetic coupling pump which comprises a clamping sleeve disposed between bearing sleeves, wherein the bearing sleeves are each mounted with their bearing front side on an axial bearing element, where the axial bearing element has a recess adapted to the bearing sleeve.

It is expedient if the recess is designed to be step-like, i.e. quasi-L-shaped with a high web and a longitudinal web. The high web extends from an inner circumference oriented towards the shaft in the direction of the opposite outer circumference. The longitudinal web adjoins the high web, which extends in the direction of an inner front side of the bearing disk.

The recess in the preferred step-like configuration is adapted in its dimension, in particular in the amount of extension of the high web to a radial configuration of the bearing sleeve so that the bearing sleeve abuts with its bearing front side against the high web of the bearing disk and with its corresponding outer circumferential section against the longitudinal web. The bearing sleeve is therefore quasi received in the bearing disk with its corresponding front side section.

The bearing sleeve is formed from a ceramic material for example from a sintered silicon carbide (SSiC). In a preferred embodiment the bearing disk, i.e. the axial bearing element is formed from a material of the same kind as this, i.e. also from a sintered silicon carbide. This is advantageous since both components have the same properties, in particular in relation to the thermal coefficient of expansion. The bearing disk forms the axial bearing element.

In order to be able to take friction-increasing measures, it can be provided to provide the axial bearing element and/or the bearing sleeve with a friction-increasing coating on the front side. It is expedient if the coating of the bearing sleeve is provided on the bearing front side to the bearing disk or to the axial bearing element or on the high web of the bearing disk or of the axial bearing element where the coating should be adapted to the hard ceramic material. It is favourable to provide a diamond coating here. It is also possible to provide a coating on the bearing disk, i.e. on the axial bearing element or on its contact region to a bearing disk receiving element or to an axial bearing holder. Although the bearing disk receiving element or the axial bearing holder can be formed from a softer material relative to the ceramic material, a diamond coating can preferably be provided.

A centring in the axial and radial direction is thus advantageously achieved with the invention by the advantageously designed ceramic bearing disk (axial bearing element), the spherical configuration of the bearing sleeve together with the spherical design of the pre-stressed clamping sleeve which can still have the particularly quasi-wave-shaped configuration with the concentric grooves mentioned as an example. The material-dependent thermal expansion difference between the different materials (SSiC and stainless steel shaft) thus compensates the pre-stressed clamping sleeve. In the cold state the clamping sleeve serves as a torque-limiting element and in the operating state (warm) compensates the length expansion of the shaft by means of the pre-stressing.

The pre-stressing of the clamping sleeve is used in this case for the force fit between the rotating parts such as, for example, impeller, bearing disks, bearing sleeves, shaft, inner magnetic rotor and the clamping sleeve itself. The pre-stressing is preferably selected so that the force fit is optimally maintained for the transmission of the friction moments even under thermal influence. The particular, quasi-wave-shaped configuration of the clamping sleeve mentioned as an example under pre-stressing in the cold state forces a (radial) deformation of the clamping sleeve inwards, where the clamping sleeve is supported on the shaft and takes over the radial guidance of the sliding bearing. Under thermal influence, the pre-stressed clamping sleeve then compensates axially and radially the material-dependent thermal length expansion differences between the different materials, i.e. between the SSiC components and the stainless steel shaft (SSiC-stainless steel=about 1:4). The invention therefore always ensures a force fit under different thermal influence (different temperatures). As already stated, the clamping sleeve "rolls" on the bearing sleeves due to the corresponding spherical configuration of the relevant front sides without loading the bearing sleeve. Under thermal influence the shaft diameter and its length vary, which is known so far. The radial centring is accomplished with the invention by means of the pre-stressed clamping sleeve which is pressed by the expanding shaft whilst retaining the pre-stress as it were from a waisted state into a cylindrical base position. This quasi-forced outward pressing of the clamping sleeve into the cylindrical base position compensates for the length expansion difference of the shaft with respect to the non-expanding or only slightly expanding ceramic bearing partners. The invention can thus advantageously dispense with static, elastic soft parts used in the prior art such as, for example, sealing material for axial compensation for expansion where at all times a true running, i.e. centring whilst simultaneously maintaining the pre-stress despite different materials is ensured in temperature range of, for example, −60° C. to +450° C. The invention can be used particularly advantageous for mounting the shaft of magnetic coupling pumps.

BRIEF DESCRIPTION OF THE DRAWING

Further advantageous embodiments of the invention are disclosed in the subclaims and the following description of the figures. In the figures

DETAILED DESCRIPTION OF PREFERRED EMBODIMENTS

In the different figures the same parts are always provided with the same reference numbers which is why these are usually only described once.

Figure 1:
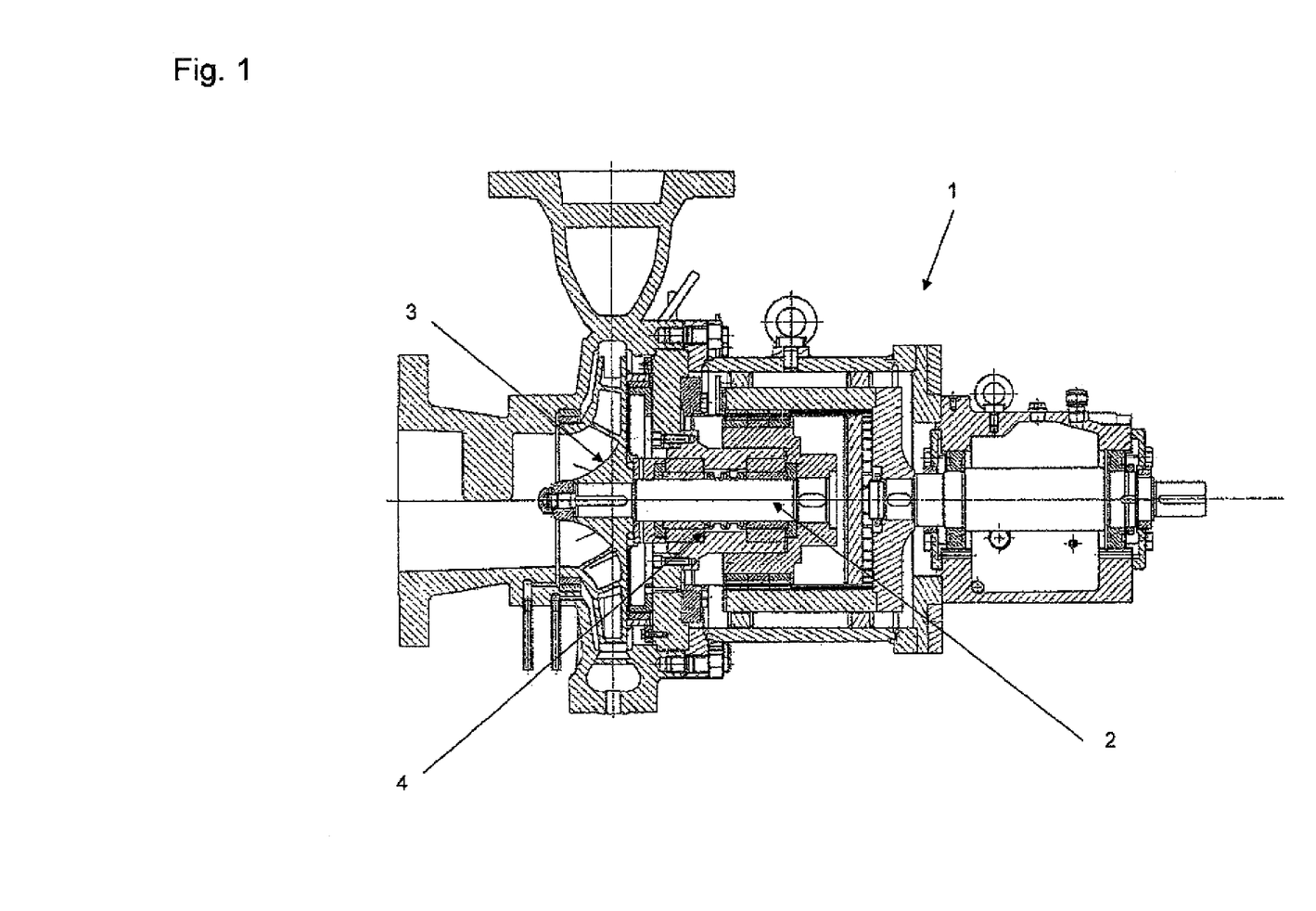
FIG. 1 shows a magnetic coupling pump in a sectional view.

FIG. 1 shows a magnetic coupling pump 1 with a pump shaft 2, e.g. as stainless steel shaft 2, which carries an impeller 3 and which is mounted in a hydrodynamic sliding bearing 4, where the hydrodynamic sliding bearing 4 can be lubricated externally by conveying medium but also by another product-compatible fluid. The magnetic coupling pump 1 is known per se, which is why this is not described in detail.

Figure 2:
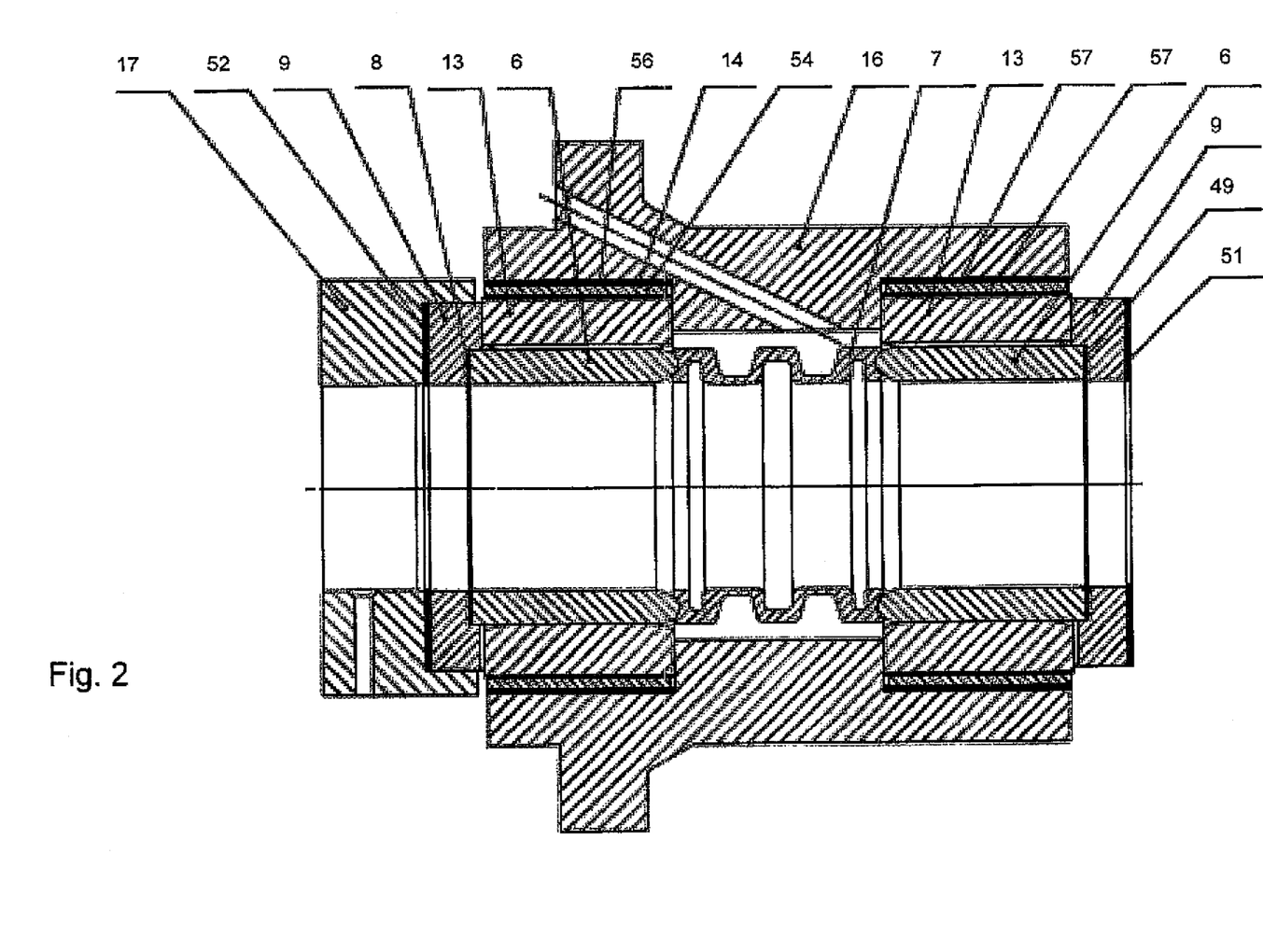
FIG. 2 shows a hydrodynamic sliding bearing of the magnetic coupling pump from FIG. 1 in an enlarged view.

The invention aims to achieve the advantageous configuration of the sliding bearing 4 of the shaft 2 or the pump shaft 2, in particular of the magnetic coupling pump 1, where the hydrodynamic sliding bearing 4 comprises a clamping sleeve 7 disposed between bearing sleeves 6, where the bearing sleeves 7 are mounted with their respective bearing front side 8 on an axial bearing element 9 in each case (FIG. 2). The axial bearing element 9 is subsequently also designated as bearing disk 9, where the hydrodynamic sliding bearing 4 is subsequently only designated as sliding bearing 4.

As can be identified, for example, in FIG. 2, the clamping sleeve 7 is disposed between two bearing sleeves 6. The respective front side 11 of the bearing sleeve 6 is in contact with the associated front sides 12 of the clamping sleeve 7. Opposite to the front side 11 on the clamping-sleeve side, the bearing sleeve 6 is mounted with its bearing front side 8 in the bearing disk 9.

The sliding bearing 4 also comprises bearing bushings 13, clamping rings 14 and a bearing casing 16. The bearing disk 9 is held in an axial bearing holder 17 which can also be designated as bearing disk receiving element 17.

The bearing sleeve 6 has a spherical configuration on its front side 11 on the clamping sleeve side, which cooperates with a corresponding spherical configuration of the relevant front side 12 of the clamping sleeve 7.

Figure 3:
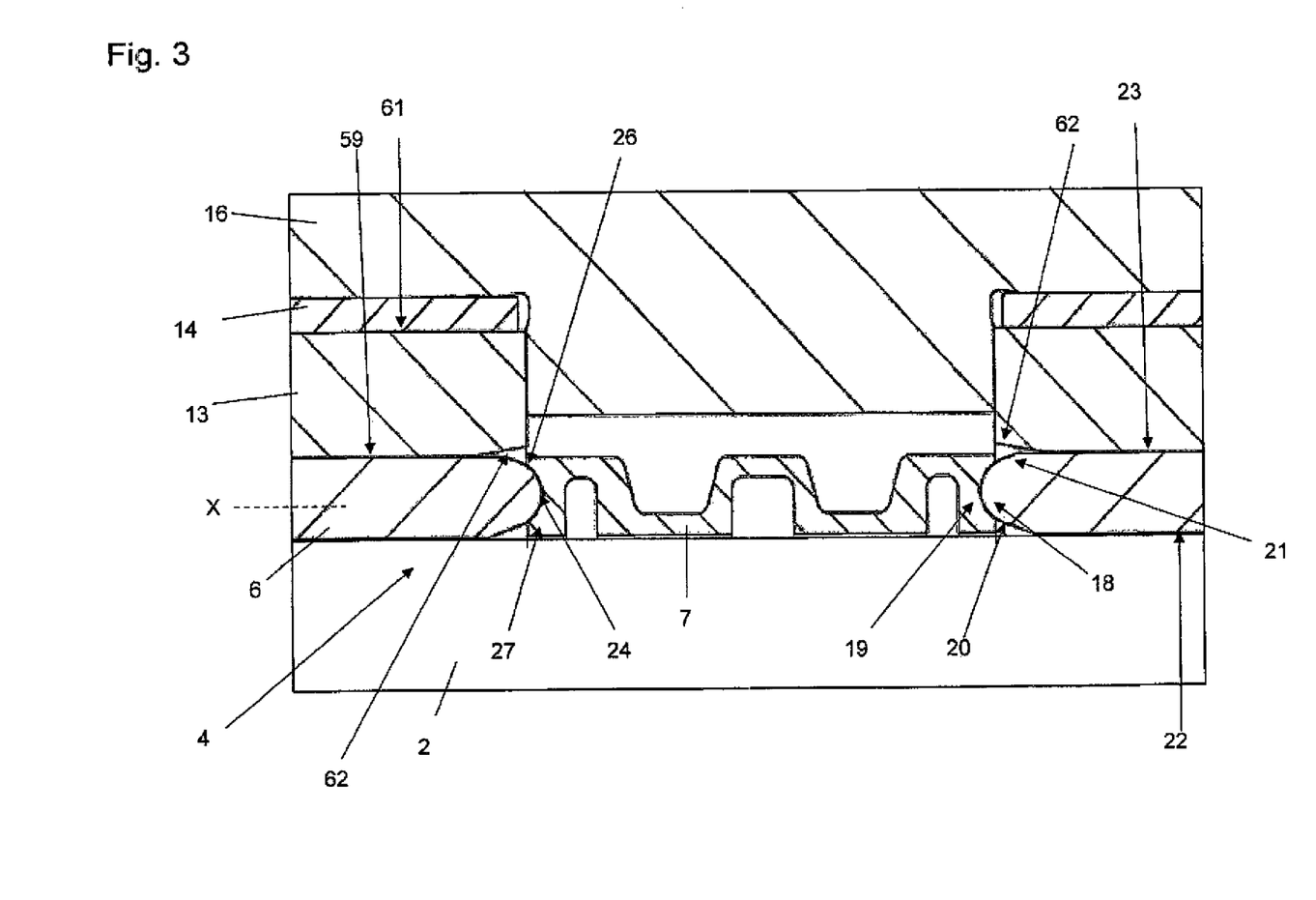
FIG. 3 shows a section of the sliding bearing from FIG. 2 with a pre-mounted clamping sleeve.
Figure 4:
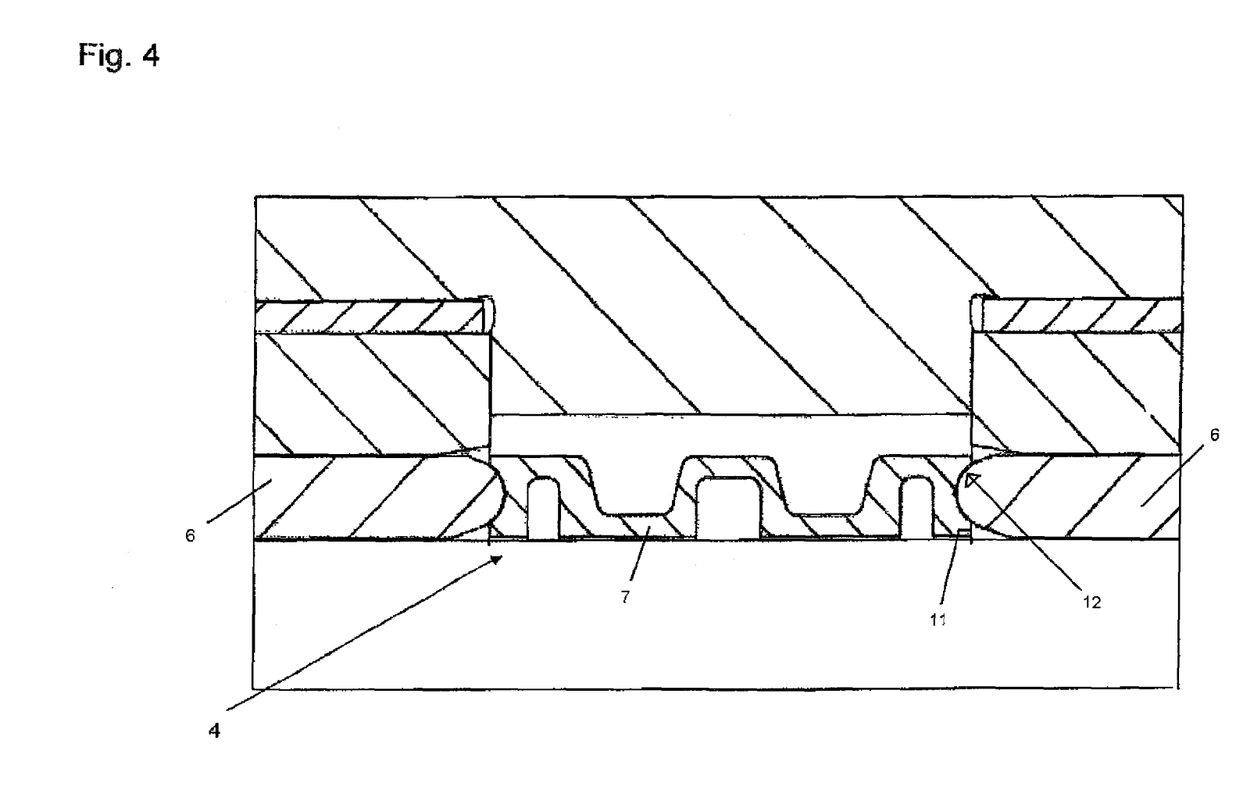
FIG. 4 shows a section of the sliding bearing from FIG. 2 with a pre-stressed clamping sleeve.
Figure 5:
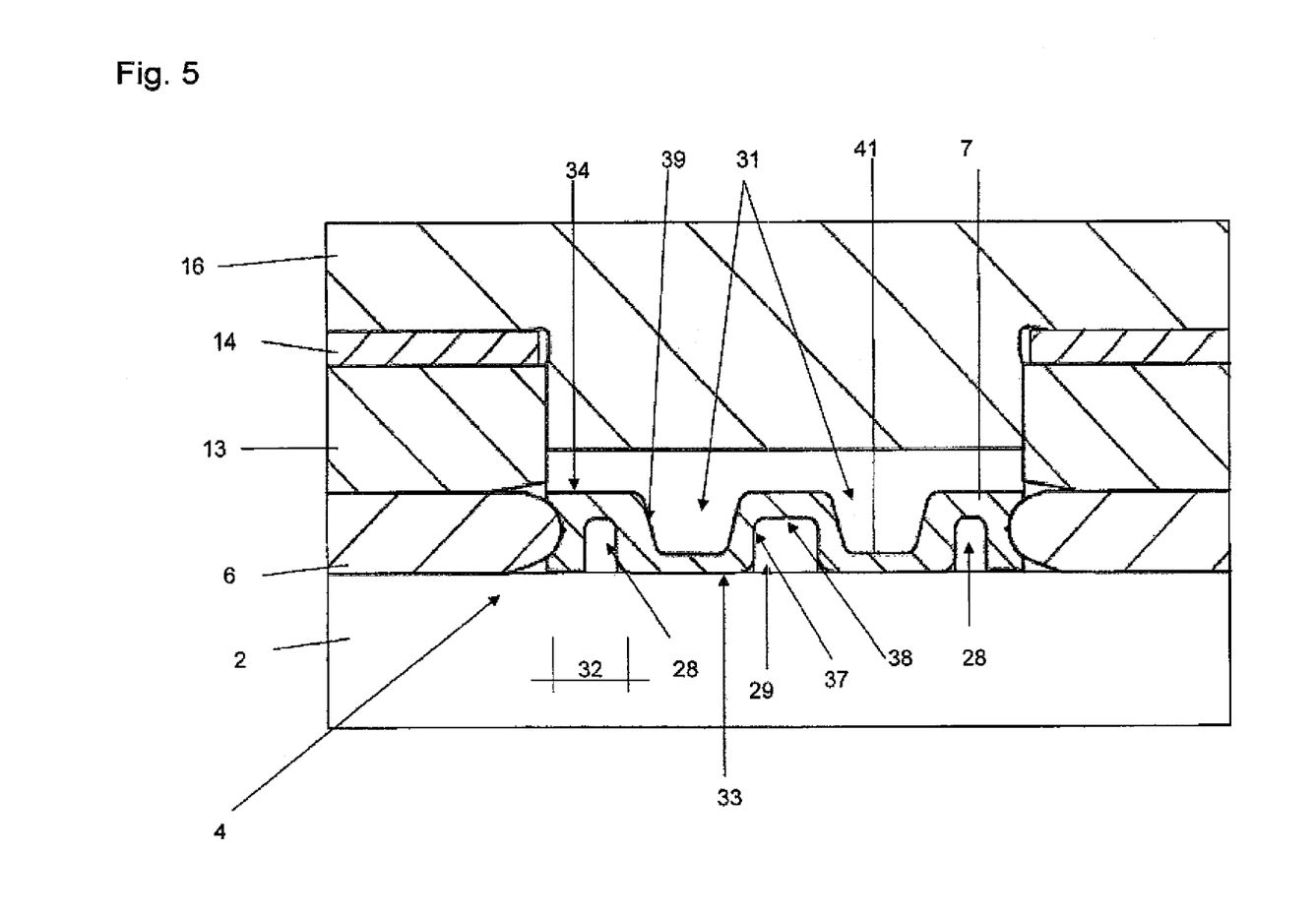
FIG. 5 shows a section of the sliding bearing from FIG. 2 under thermal influence and FIG. 6 shows a section of the sliding bearing from FIG. 2 for the configuration of the bearing disk.

In a preferred embodiment the front side 11 on the clamping sleeve side of the bearing sleeve 6 has a spherically designed region 18, preferably a spherical section-like surface 18 which engages in a correspondingly designed spherical indentation 19 of the clamping sleeve 7, as can be identified, for example, in FIG. 3.

in a further preferred embodiment, the bearing sleeve 6, as can be seen in FIGS. 3 to 5, has the spherically designed region 18 on its front side 11 on the clamping sleeve side, on which transition regions 20, 21, i.e. an inner transition region 20 and an outer transition region 21 are disposed in the direction of the inner or outer circumference 22, 23 of the bearing sleeve 6. The inner circumference 22 of the bearing sleeve 6 is oriented in the direction of the shaft 2, where the outer circumference 23 is disposed opposite thereto, is preferably oriented in the direction of the bearing bushing 13. The inner transition region 20 is oriented slightly inclined away from the inner circumferential surface 22, running upwards in the plane of the drawing, and adjoins the spherical region 18. The outer transition region 21 is designed to run in the opposite direction thereto from the spherical region 18 opening onto the outer circumferential surface 23, and therefore also extends upwards in the plane of the drawing as shown. It is further preferred if the inner transition region 20 has a greater amount of extension than the outer transition region 21. The globe-like surface 18, i.e. the spherical region 18 is preferably disposed off-centre or upwards in the plane of the drawing, i.e. offset outwards with its zenith 24 accordingly relative to a central axis X of the bearing sleeve 6.

The front side 12 of the clamping sleeve 7 on the bearing sleeve side is designed to correspond thereto, where front-side residual webs 26, 27 are disposed adjacent to the indentation 19. The upper residual web 26 shown in the plane of the drawing has a smaller extension than the lower residual web 27 shown in the plane of the drawing so that its design is adapted to the configuration of the transition regions 20 and 21. The indentation 19 is therefore also disposed off-centre.

As a result of the spherical configuration of the intermeshing front sides, the clamping sleeve 7 "rolls" on the bearing sleeves 6 without loading the bearing sleeve 6.

In a preferred embodiment the clamping sleeve 7 has at least one concentric groove 28, 29 and/or 31, particularly preferably two front-side concentric grooves 28, a central concentric groove 29 and two intermediate concentric grooves 31.

The concentric grooves 28 to 31 are preferably designed as equatorial concentric grooves 28 to 31 and can also be designated as material recesses 28 to 31. As a result of the material recesses 28 to 31, the clamping sleeve 7 is quasi-wave shaped.

The front-side concentric grooves 28 are introduced into the clamping sleeve 7 in a front-side region 32 of the clamping sleeve 7 from the inner circumference 33 in the direction of the outer circumference 34. The front-side concentric grooves 28 are slot-like and can have a rounded base 36, where for example, a flat configuration of the base 36 can be identified in FIGS. 3 to 5.

The central concentric grooves 29 are disposed between the front-side concentric grooves 28 and in the exemplary embodiment shown are broader than the front-side concentric grooves 28. The central concentric grooves 29 are quasi-U-shaped, where U legs 37 can be inclined to the base 38 or perpendicular thereto. The central concentric grooves 29 are introduced into the clamping sleeve 7 from the inner circumference 33 in the direction of the outer circumference 34. The front-side concentric grooves 28 therefore have the same orientation as the central concentric grooves 29.

The intermediate concentric grooves 31 are disposed between the central concentric grooves 29 and the front-side concentric grooves 29 but are introduced from the outer circumference 34 of the clamping sleeve 7 in the direction of the inner circumference 33 thereof.

As can be seen, it can be provided to design the intermediate concentric grooves 31 to be quasi-U-shaped, where the U-legs 39 are arranged to be oriented away from one another at an obtuse angle to the base 41 so that a material recess expanding conically from the base 41 in the direction of the outer circumference 34 is formed.

Naturally the geometric configuration of the concentric grooves 28 to 31 or material recesses 28 to 31 mentioned as an example are not restrictive. In particular, the sequence and number of the concentric grooves 28 to 31 is only an example.

The reference numbers for the description of the spherical configuration of the clamping sleeve 7 and the bearing sleeve 6 are indicated in FIG. 3, where the reference numbers relating to the clamping sleeve 7 with its concentric grooves 28 to 31 are indicated in FIG. 5, with FIG. 4 being kept free of reference numbers which should serve the purpose of clarity.

In the exemplary embodiment shown in FIG. 3, the sliding bearing 4 is pre-assembled, where the clamping sleeve 7 with its inner circumference 33 is completely spaced apart from the shaft surface.

FIG. 4 shows a pre-stressed state where the inner circumference 33 of the clamping sleeve 7 has contact with the shaft surface in the region of the intermediate concentric grooves 31. The front-side regions 32 of the inner circumference 33 are at a distance from the shaft surface.

FIG. 5 shows an operating state when a temperature of, for example, 320° C. exists. By means of the advantageously designed clamping sleeve 7, compensation for expansion of the shaft 2 is advantageously achieved both in the axial and in the radial direction, as shown in FIG. 5. The front-side regions 32 of the inner circumference are also in contact with the shaft surface.

Figure 6:
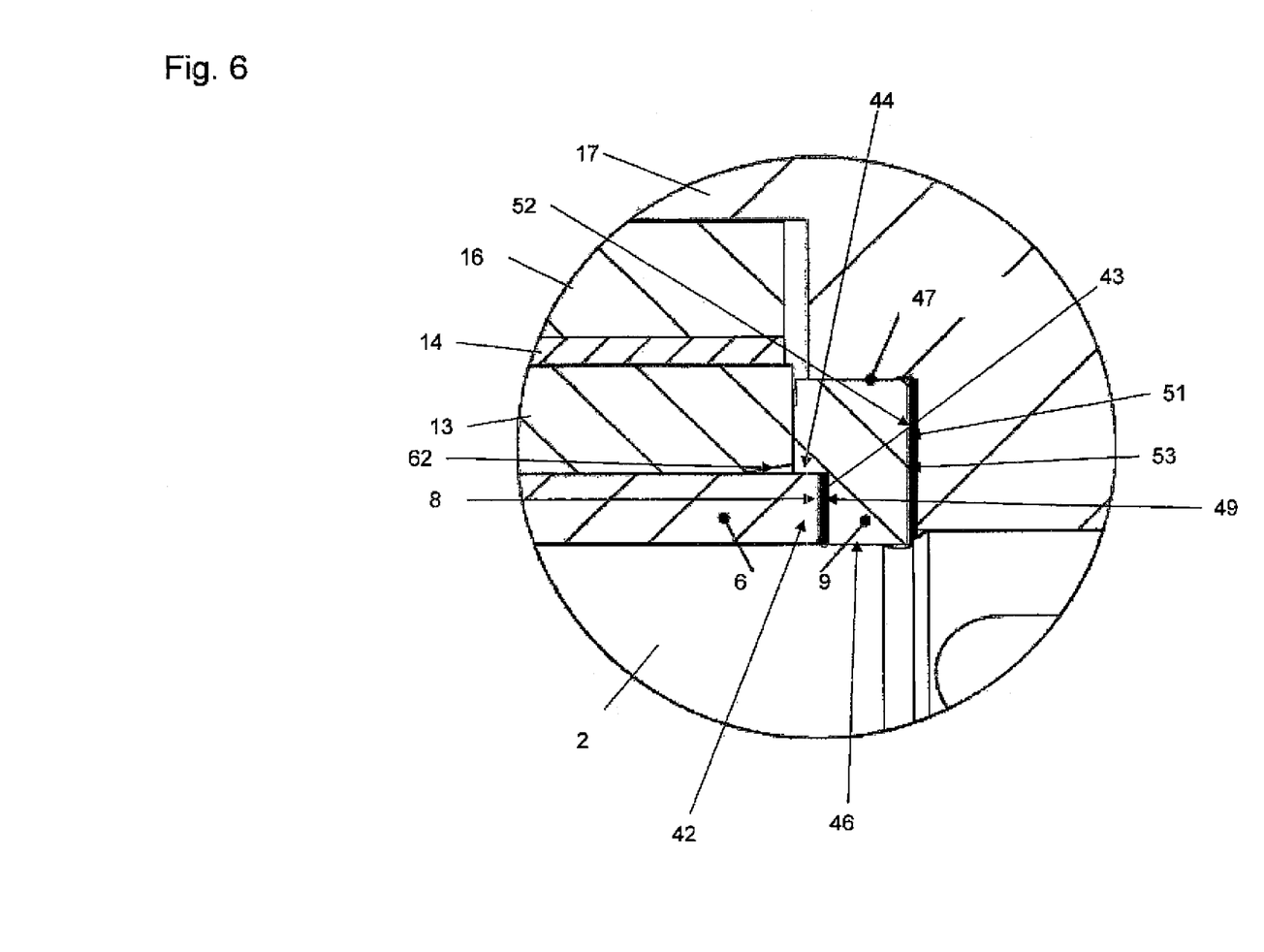

FIG. 6 shows the particular mounting of the bearing sleeve 6 in the bearing disk 9.

The bearing disk 9 has a recess 42 which is preferably designed in a step shape. The recess 42 has a high web 43 and an adjoining longitudinal web 44. In the plane of the drawing the high web 43 is oriented from an inner circumference 46 of the bearing disk 9 in the direction of the outer circumference 47 and goes over into the longitudinal web 44 which is oriented towards an inner front side 48 of the bearing disk 9. The inner front side 48 of the bearing disk 9 can be in contact with the bearing bushing 13 as can be seen in FIG. 6. The high web 43 can also be designated as radial web. The step-like recess 42 is thus disposed on the inside.

In its dimension the recess 42 is adapted to the configuration of the bearing sleeve 6 in the radial direction but also in the axial direction so that the respective bearing front side 8 and an adjoining bearing front side region of the respective bearing sleeve 6 is as it were received in the bearing disk 9.

The bearing sleeve 6 consists, for example, of a ceramic material, e.g. of a sintered silicon carbide (SSiC). Advantageously the bearing disk can consist of a ceramic material, e.g. of the material identical to the bearing sleeve 6, i.e. for example, of a sintered silicon carbide (SSiC). Thus, thermally induced expansion differences of the bearing sleeve 6 with respect to the bearing disk 9 are eliminated.

It is still possible to provide friction-increasing coatings 49, 51 as shown, for example, in FIG. 6.

The friction-increasing coating 49 can act between the bearing-side front side 8 of the bearing sleeve 6 and the high web 43. The friction-increasing coating 49 can either be disposed on the bearing front side 8 or on the high web 43 and preferably executed as diamond coating. The friction-increasing coating 49, 51 can, for example, be glued in the form of a diamond-coated film or sprayed-on as diamond coating where the application methods mentioned as an example should naturally not be restrictive. The friction-increasing coating 51 can either be disposed on the outer front side 52 of the bearing disk 9 or on the corresponding contact surface 53 of the axial bearing holder 17 and can also be executed as diamond coating (e.g. diamond-coated film). Although FIG. 6 merely shows one side, the same applies to the side of the sliding bearing 4 not shown.

The clamping sleeve 7 can be formed, for example, from a high-temperature-resistant stainless steel or from a material having similar physical properties. The clamping ring 14 can be formed from a metallic or non-metallic material, preferably from a metallic special material such as, for example, from Duplex steel or a material having similar physical properties. Possible materials for the clamping ring 14 can be high-temperature-resistant stainless steels or spring steels where the clamping sleeve 7 can also be formed of Duplex steels or of a spring steel.

A friction-increasing coating 57 can be identified in FIG. 2, which is disposed on the clamping ring 14 or on the inner circumference 54 thereof and on the outer circumference 56 thereof. The friction-increasing coating 57 can also consist of a diamond coating like the coatings 49 and 51. Preferably a double pressure bond is formed between the components clamping ring 14/bearing bushing 13 and clamping ring 14/bearing bushing 16, where the clamping ring 14, the bearing bushing 13 and the bearing housing 16 are mounted under the influence of heat and then cooled in each case. Thus, a very high joint pressure is achieved which ensures a radial prevention of rotation and an axial prevention of displacement which is also maintained under operating conditions, in particular under the influence of heat. By means of the advantageous multilayer pressure bond, the radial and axial load-bearing capacity of the components in the entire unit is increased, i.e. in the hydrodynamic sliding bearing many fold. Furthermore, for example, it can also be seen in FIGS. 3 and 6 that the bearing bushing 13 has bevelled edges (edge bevelling 62) on its inner circumference 59. Edge bevellings 62 can also be disposed opposite on the outer circumference 61. The edge bevellings 62 can be provided on both sides, i.e. in the plane of the drawing on the right and/or left front side. This measure is particularly expedient when starting up and shutting down the exemplary magnetic coupling pump 1 since the edge pressure which could be produced by the wobbling movement of the rotating unit and effects of radial forces from a pressure connector on the impeller can be compensated. In this respect, edge bevellings 62 are advantageous in order to avoid edge loadings e.g. when starting up and shutting down the magnetic coupling pump 1, e.g. by radial hydraulic loading. A partial or punctuate bearing loading is thus almost excluded.

The material pairings mentioned as an example for the bearing sleeve 6, the bearing disks 9 and the bearing bushing 13 and the clamping sleeve 7 but also of the clamping ring 14 should naturally not be restrictive. It is also feasible to form the respective components in principle from all suitable ceramics. Also tungsten carbide, carbon, Teflon (PTFE), glass-fibre reinforced materials, carbon-fibre reinforced materials or metal materials are possible as material or as material combinations.

The invention claimed is:

1. A hydrodynamic sliding bearing of a shaft, said hydrodynamic sliding bearing comprising:
   axial bearing elements;
   bearing sleeves mounted with their front sides on the axial bearing elements, respectively; and
   a clamping sleeve disposed between the bearing sleeves, wherein one of the bearing sleeves and the clamping sleeve have confronting front sides provided with intermeshing spherical regions, and another one of the bearing sleeves and the clamping sleeve have confronting front sides provided with intermeshing spherical regions, wherein the spherical region of each of the bearing sleeves has a zenith disposed in offset relationship to a central axis of the respective bearing sleeve.

2. The hydrodynamic sliding bearing of claim 1, constructed for a magnetic coupling pump.

3. The hydrodynamic sliding bearing of claim 1, wherein the front side of each of the bearing sleeves has a spherical surface, and the front sides of the clamping sleeve each have an indentation complementary to the spherical surface of the bearing sleeves.

4. The hydrodynamic sliding bearing of claim 1, wherein the front side of each of the bearing sleeves has transition regions which adjoin the spherical region.

5. The hydrodynamic sliding bearing of claim 1, wherein the clamping sleeve has at least one groove.

6. The hydrodynamic sliding bearing of claim 1, wherein the clamping sleeve has front-side concentric grooves, central concentric grooves or intermediate concentric grooves.

7. The hydrodynamic sliding bearing of claim 1, wherein the clamping sleeve has an equatorial groove of slot-shape or U shape.

8. The hydrodynamic sliding bearing of claim 1, wherein the axial bearing elements each have a recess shaped to conform to the front side of the respective bearing sleeves.

9. The hydrodynamic sliding bearing of claim 1, wherein the axial bearing elements each have a step-like recess having a high web and a longitudinal web.

10. The hydrodynamic sliding bearing of claim 1, wherein the bearing sleeves and the axial bearing elements are formed from a ceramic material, and the clamping sleeve is formed from a stainless steel.

11. The hydrodynamic sliding bearing of claim 10, wherein the ceramic material is a sintered silicon carbide.

12. The hydrodynamic sliding bearing of claim 10, wherein the stainless steel is a high-temperature-resistance stainless steel.

13. A hydrodynamic sliding bearing of a shaft, said hydrodynamic sliding bearing comprising:

axial bearing elements;

bearing sleeves mounted with their front sides on the axial bearing elements, respectively; and a clamping sleeve disposed between the bearing sleeves and having at least one groove, wherein each of the bearing sleeves has a spherical region having a zenith disposed in offset relationship to a central axis of the respective bearing sleeve.

14. A hydrodynamic sliding bearing of a shaft, said hydrodynamic sliding bearing comprising:

axial bearing elements;

bearing sleeves mounted with their front sides on the axial bearing elements, respectively; and a clamping sleeve disposed between the bearing sleeves, wherein the axial bearing elements each have a recess shaped to conform to the front side of the respective bearing sleeves, wherein each of the bearing sleeves has a spherical region having a zenith disposed in offset relationship to a central axis of the respective bearing sleeve.

* * * * *